July 19, 1966 J. H. PAYNE, JR 3,262,051
METHOD AND APPARATUS FOR DETERMINING AND CONTROLLING
THE CONCENTRATION OF NITRIC ACID IN A
SOLUTION CONTAINING THE SAME
Filed Feb. 26, 1960 3 Sheets-Sheet 1
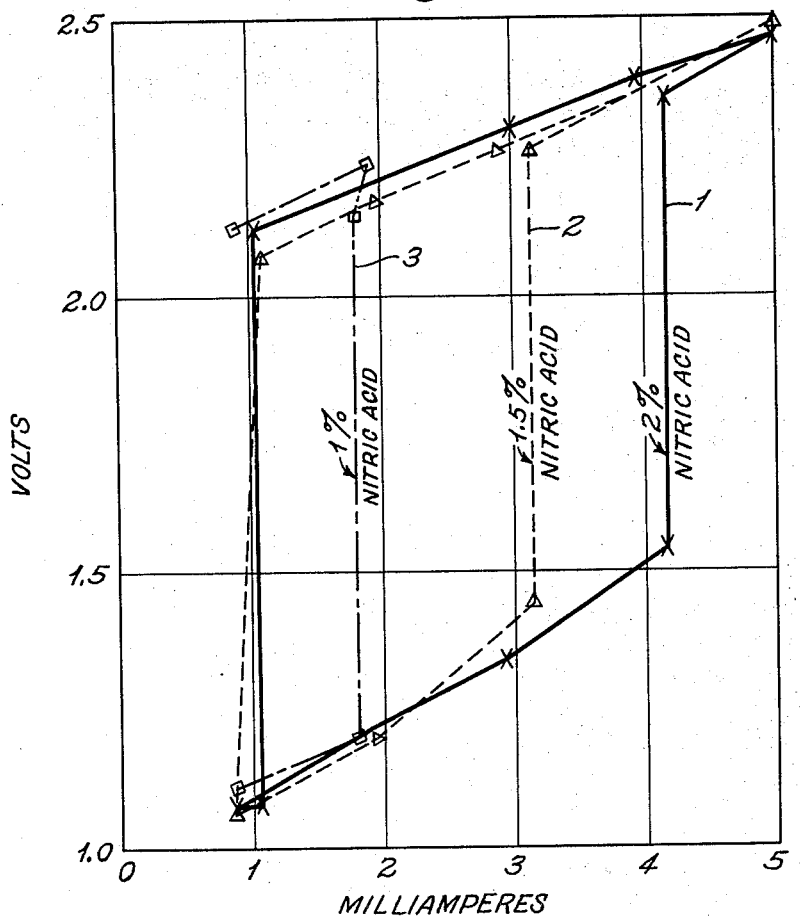
Fig. 1.
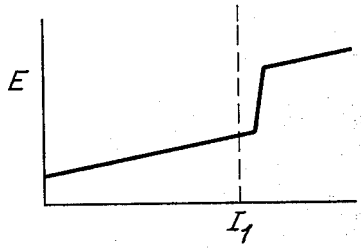
Fig. 2.ª
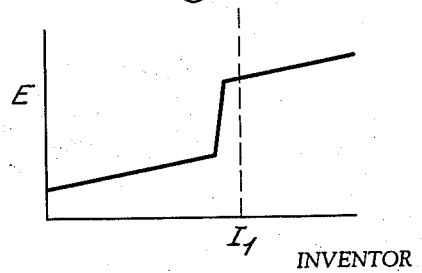
Fig. 2.ᵇ
INVENTOR
John H. Payne, Jr.
BY Martin Fleit
ATTORNEY INVENTOR
John H. Payne, Jr.
BY Martin Fleit
ATTORNEY

INVENTOR.
JOHN H. PAYNE, JR.
ATTORNEY

United States Patent Office 3,262,051
Patented July 19, 1966

3,262,051
METHOD AND APPARATUS FOR DETERMINING AND CONTROLLING THE CONCENTRATION OF NITRIC ACID IN A SOLUTION CONTAINING THE SAME
John H. Payne, Jr., Ladue, Mo., assignor to Monsanto Company, a corporation of Delaware
Filed Feb. 26, 1960, Ser. No. 11,300
21 Claims. (Cl. 324—29)

The present invention relates to methods and apparatus for electrochemical analysis of solutions and more particularly to methods and apparatus useful for determining and/or controlling the concentration of nitric acid in a solution containing the same.

In some applications it is desirable to employ a solution of nitric acid under such conditions that analysis by conventional methods is either not convenient or not feasible. Examples of such solutions are provided by the baths which are widely employed to brighten aluminum and which are generally composed primarily of nitric acid, phosphoric acid, or a mixture of phosphoric acid and sulfuric acid, and sufficient water to provide a proper acid concentration. Controlling the concentration of the non-oxidizing acid in such solutions is not difficult and with normal use of the bath an adjustment every 24 hours will generally suffice. However, the control of nitric acid concentration is a serious problem for the reason that frequent adjustments are required and for the reason that the nitric acid concentration must be kept within relatively narrow limits for best results.

Prior to this invention there has been no completely satisfactory method or apparatus for rapidly and accurately determining the concentration of nitric acid in solutions containing a second source of hydrogen ions and prior procedures for controlling the relative concentrations of the components of such solutions have relied on chemical analysis or operator judgment. Even the most skilled operator is not capable of accurately estimating nitric acid concentration in all instances and to even approach this aim an operator must devote a large amount of attention to the bath. The use of chemical analysis offers little or no improvement for the reason that the chemical analysis procedures previously available are quite time consuming and, in fact, involve such long intervals that the bath concentration usually changes before the analysis of the previous composition is completed. Further, such procedures require laboratory equipment and skilled technicians or chemists. The lack of rapid methods and means for determining nitric acid concentration in such solutions has necessitated the addition of relatively large quantities of acid to bring the concentration of the bath back to a proper level and such large fluctuations in operating conditions have resulted in lack of uniformity of product. In addition, the lack of suitable analytical methods and apparatus has prevented the development of a system for automatically controlling the concentration of the bath by small, frequent additions of acid.

It is a primary object of this invention to provide a simple, accurate and rapid analytical method for measuring the concentration of nitric acid in an aqueous bath containing the same.

It is another object of the invention to provide simple and efficient apparatus useful for rapidly determining the concentration of nitric acid even in a bath containing another acid.

It is still another object of the invention to provide methods and apparatus for determining the concentration of nitric acid in aluminum brightening baths, which methods and apparatus may be utilized by production personnel without extensive special training.

It is a further object of the invention to provide improved apparatus for automatically maintaining within selected limits the concentration of nitric acid in an aqueous bath containing the same.

It is a still further object of the invention to provide simple apparatus for signaling the drop below a selected minimum of the nitric acid concentration in an aqueous bath.

The method and apparatus of the present invention result in part from the discovery that under certain conditions the voltage across a pair of electrodes in an aqueous bath containing nitric acid is a function, although not a simple function, of nitric acid concentration and current density, the term "current density" being defined for purposes of this specification and claims as the electric current passing between a pair of electrodes in standard units divided by the surface area of the cathode. Within limits, the voltage across a pair of electrodes, disposed in a bath as above described, with a selected current density through the bath, abruptly changes from a relatively low value to a relative high value with only a small decrease in nitric acid concentration at a certain characteristic concentration of nitric acid, and displays an abrupt change from a relatively high value to a relatively low value with a small increase in nitric acid concentration at another characteristic concentration. Similarly, if the current density through a bath having a fixed concentration of nitric acid is gradually increased, the voltage across the bath increases at a relatively low rate and in a generally linear fashion; however, upon a characteristic current density being obtained, the voltage across the bath rises quite suddenly to a higher value. Thereafter, a decrease in current density causes the voltage to fall linearly at a relatively slow rate until the current density is well below the value at which the abrupt rise in voltage was obtained. The voltage then falls quite suddenly to an intersection with the voltage-current density curve produced during gradual increase of current density, so that a plot of the voltage versus current density for such a bath describes a hysteresis-like loop. That within the range of this hysteresis loop a single current density could produce quite different voltages, depending upon whether approached from higher or lower currents, was completely unexpected, and it is this unexpected relationship that provides the basis for a far more sensitive determination of nitric acid concentration than could be made by voltage measurements if a plot of voltage versus current followed a simple curve.

In accordance with this invention there is provided a method and apparatus for producing in a bath, which can contain nitric acid, a current density within a selected range and for indicating an abrupt change in the voltage across the bath which may result from a change of nitric acid concentration or a change of current density. Preferably the current through the bath is repetitively varied from a relatively low to a relatively high level or intermittently interrupted with notice being taken of the point at which the voltage undergoes an abrupt rise. Alternatively, the point at which the voltage across the bath undergoes an abrupt decrease can be used as the controlling criterion but it has been found that the point of abrupt rise in voltage is far more precisely characteristic of nitric acid concentration than is the point of abrupt decrease in voltage.

Accordnig to one embodiment of the invention there is provided an apparatus for performing the steps of measuring the voltage across a bath containing nitric acid and for gradually increasing the density of the current passing through the bath. As the current density is varied, the point at which the voltage drop across the bath undergoes an abrupt increase is noted and by comparison with baths of known composition under similar conditions the precise nitric acid concentration of the test bath is established. Greater accuracy is obtained if the current density is cyclically varied such that it repetitively passes through the point where the voltage across the bath rises abruptly, and the apparatus is provided with means to give an average indication of the point at which the abrupt change in voltage is encountered.

According to a second embodiment of this invention, there is provided apparatus including a means for supplying current to a bath such as to provide within the bath a substantially constant current density of a selected value, means for repeatedly interrupting the current, and means for readily ascertaining if the voltage across the bath, during periods of current, is at a relatively high or at a relatively low value. This arrangement is particularly useful in providing a warning if the nitric acid concentration of a bath drops below a selected level or for automatically maintaining the nitric acid in a bath above a selected minimum concentration. Wih this arrangement the current density in the bath is set at a level slightly below that at which an abrupt increase in the voltage across the bath is encountered. Because the current density at which an abrupt change in voltage is encountered decreases with decreasing nitric acid concentration, any appreciable drop in the nitric acid concentration of the bath, with the current density in the bath held substantially constant, results in a marked increase in the voltage across the bath. This abrupt increase in voltage can be measured by a standard instrument to give an indication that the nitric acid concentration has dropped below a selected level, or a sensing means for determining the abrupt change can be employed to activate a visual or audio alarm. Alternatively, the sensing means for determining the abrupt change in voltage can control one or more solenoid operated valves for a set time sufficient to result in the automatic addition of sufficient nitric acid to bring the nitric acid concentration in the bath above a selected minimum. In an arrangement of this type, repeated interruption of the current is desirable so that the lag, due to the hysteresis effect previously mentioned, is minimized and the system indicates a nitric acid concentration above the selected minimum as rapidly as possible following a corrective acid addition.

The nitric acid content in a solution being analyzed or tested in accordance with this invention can be very low and satisfactory results, under some conditions, can be obtained with baths containing 0.1% or less nitric acid. Somewhat greater accuracy can be obtained in most instances if the bath contains at least about 0.5% nitric acid because under such conditions the current density required is usually high enough that the effect of secondary influences is not excessive. At the other extreme, the nitric acid concentration of the bath under some conditions can suitably be as high as about 75% but should not appreciably exceed this because at such high acid concentrations undesirably high current densities are required. In most instances, best results are obtained with baths in which the nitric acid concentration is below about 30%.

As previously mentioned, the bath to be analyzed can contain a secondary source of hydrogen ions. This secondary source may constitute one or more acidic substances of almost any type which is not appreciably affected by nitric acid and does not react with nitric acid. In almost all instances the secondary source of hydrogen ions will comprise phosphoric acid, sulphuric acid, or mixtures of these two acids, although other acidic materials such as acid salts may also be present. The amount of the secondary acid or acids in a solution or bath to be analyzed can advantageously be sufficient to reduce the water content of the bath below at least about 90% and preferably below about 40% or even 25%. Since in most applications of this nature the nitric acid concentration is below about 25%, the above means that the combined concentration of sulphuric and phosphoric acid most advantageously can be from about 15% to 50% or higher if the presence of these acids is not otherwise undesirable.

As indicated above, the bath or solution to be tested or the concentration of which is to be controlled may contain various salts. For example, a bath employed for brightening aluminum will normally contain salts of aluminum, and various other salts may be present as a result of impurities or for other reasons. It should not be concluded, however, that high concentrations of inorganic salts do not have an effect upon the current density at which an abrupt change in voltage is observed because it has been found that a slight correction normally must be made if the bath or solution is initially salt-free and thereafter becomes heavily laden with salts. In addition to salts, a bath or solution can satisfactorily contain any material which does not react at an undesirable rate with nitric acid and which is reasonably stable in the presence of this acid, such as selected surface active agents and solvents. In some instances a solution to be tested or the concentration of which is to be controlled may even be composed predominantly of an organic material which is being reacted with nitric acid at a controlled rate and an example of a material of this type which may be present in a solution to be tested on analyzed in accordance with this invention is toluene.

Normally a bath to be analyzed in accordance with this invention will contain sufficient water to make the bath electrically conductive, and in most instances additional water is present for various other reasons. A certain amount of additional water can actually be advantageous but if the water content of the bath becomes excesive, as above indicated, undesirably low current densities may be required for a satisfactory analysis. In view of the above, it can be said that the bath, under proper conditions, can contain from about 1% to 90% water but that the water content of the bath is preferably from about 10% to 60% by weight.

The temperature of a bath to be analyzed or tested in accordance with this invention may vary within reasonably wide limits but best results are obtained if the bath is hot. At temperatures below about 60° C. such low current densities may be required and the voltage shift may be so imperceptible that a satisfactory analysis or determination may not be obtainable. Preferably the bath is at a temperature of between about 80° C. and 120° C., although, if desired, baths at even higher temperatures may be employed. The temperature of the bath has a pronounced effect upon the current density at which the abrupt change in voltage is observed and where the method and apparatus of this invention are employed for control purposes, the bath is preferably held at a reasonably constant temperature. If the temperature of the bath is allowed to fluctuate more than about 5° to 10° from normal without corresponding adjustments being made in the test or control equipment, satisfactory results may not be obtained, and in instances where the method of this invention is employed for precise analysis, the temperature of the solution of unknown nitric acid concentration must correspond within 1° or 2° to that of the standard solutions used for calibrating the equipment if an accurate determination of nitric acid is to be expected.

The current density necessary to obtain an abrupt change in voltage across the nitric acid bath as above described is dependent upon a number of factors, such as temperature and acid concentration, but in substantially all instances is well above levels at which conductivity measurements of a conventional nature might be performed. The invention can be practiced under extreme conditions using a current density as low as .01 amp per square centimeter or as high as 10 amps or more per square centimeter of exposed cathode area, but best results generally are achieved using current densities of from 0.1 to 2 amps per square centimeter. If the bath conditions in any particular instance are such that the current through the test equipment is undesirably high or undesirably low, it can be controlled by varying the exposed area of the cathode within reasonable limits, but if the area is too large, an excessively prolonged period is required for the liberated hydrogen to be dissipated from the cathode. For this reason the cathode should seldom be larger in area than about 10 square millimeters and is preferably less than about 5 square millimeters in area. On the other hand, the cathode should be large enough to provide a current large enough that it can be readily measured. It has been found that in actual practice the exposed end of a 14 to 22 guage wire provides an excellent cathode of a desirable surface area for most applications. The surface area of the anode is not critical when the area of the cathode is properly selected, although it will be understood that the anode should offer at least as much area as the cathode and preferably several times more area. The electrodes can suitably be formed from any inert conductor which does not normally have or develop in an acid bath a surface coating of a nonconductive material, and examples of suitable materials are gold, platinum and other noble metals. Platinum electrodes are generally preferred.

The above and still further objects, features and advantages of the present invention will become apparent upon consideration of the following detailed description of several embodiments thereof, especially when taken in conjunction with the accompanying drawings, wherein:

FIGURE 1 is a series of curves illustrating the voltage versus current characteristics of phosphoric acid-nitric acid baths of different concentrations;

FIGURES 2a and 2b are graphs illustrating a method of employing variation in bath characteristics for measuring or determining nitric acid concentration;

Referring now specifically to FIGURE 1 of the accompanying drawings, the solid line curve, curve #1, is indicative of the voltage versus current characteristic of an acid bath with a concentration of 2% nitric acid. More particularly, the graph of FIGURE 1 plots the voltage across two electrodes disposed in a phosphoric acid-nitric acid bath as a function of current passed through the bath. The second curve, curve #2, is a plot of the voltage versus current characteristic of a bath having a 1½% nitric acid concentration, whereas curve #3 is a plot of voltage versus current characteristics of a bath having a 1% nitric acid concentration. The basic bath employed for determining these curves had a 70% concentration of phosphoric acid, a 10% concentration of aluminum phosphate and a water content of 20%. Nitric acid was added, as required, to produce concentrations of 1, 1½ and 2%. The temperature of the bath was maintained at between 87° to 95° C., and the exposed area of the cathode was approximately .008 square centimeter.

It will be noted that in each of these curves as the current was increased the voltage gradually increased until a point was reached at which the voltage rose quite suddenly to a new value. In each of the three curves the voltage continued to increase with current after the rapid voltage rise, although this fact is of no importance in the application to the present invention.

Once the voltage obtains its higher level, decreases in current produce a voltage versus current curve which is approximately parallel to the original curve but displaced therefrom by the amount of the sudden rise in voltage at the critical point. It is apparent that the concentration of nitric acid determines the point on the curves at which the voltage across the bath suddenly increases and therefore a method is provided for determining concentration.

Referring to FIGURE 2a, a condition is illustrated in which the concentration of nitric acid is sufficiently high that at the current $I_1$ the voltage across the bath is in the low voltage condition. In FIGURE 2b, the concentration of the bath is such that at the current $I_1$ the voltage across the bath is in the high voltage condition. The difference between the concentrations of the baths illustrated in FIGURE 2a and 2b is a difference of approximately 2.5% of the higher value; that is, the concentration in FIGURE 2a is 4% and the concentration in FIGURE 2b is 3.9%. It will be seen from this that by establishing a current density in a bath at a level very near that at which an abrupt change in voltage across the bath is encountered, only a very small change in nitric acid concentration is necessary to result in a relatively large change in voltage.

Figure 3:
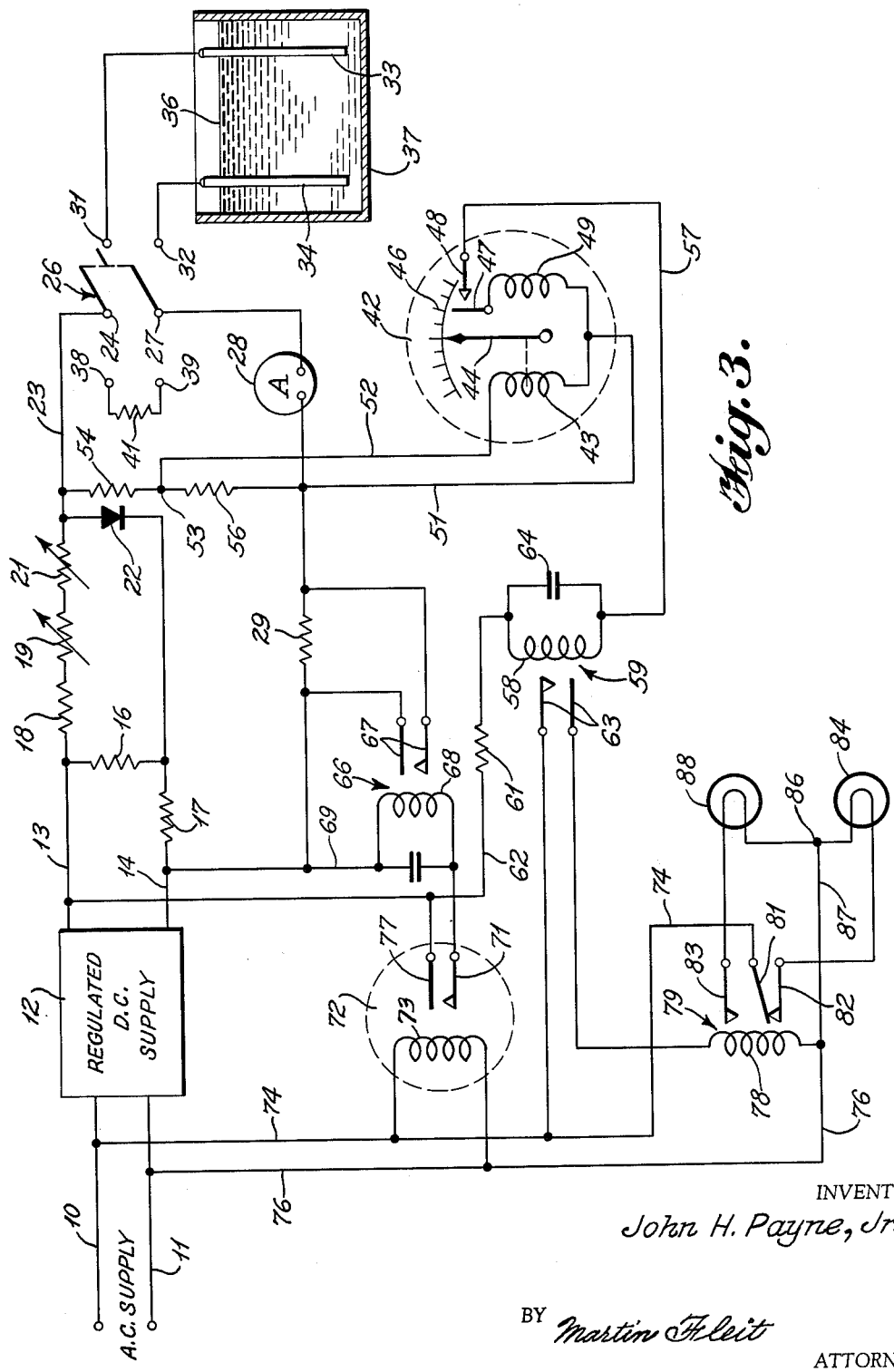
FIGURE 3 is a schematic wiring diagram of an electrical circuit useful for performing the methods of determining nitric acid concentration in accordance with the present invention.

Referring now specifically to FIGURE 3 of the accompanying drawings, there is illustrated a circuit for practicing the method of the present invention. Alternating current which may be derived from a standard industrial wiring source is developed between leads 10 and 11 which are connected to supply power to a regulated D.C. power supply 12. The power supply 12 develops regulated direct current across leads 13 and 14 having resistors 17 and 16 connected in series thereacross. The lead 13 is connected to the junction of resistors 16 and 17 via a series circuit comprising a resistor 18, a first variable resistor 19, a second variable resistor 21 and a diode 22. The cathode of the diode is connected to the junction of the resistors 16 and 17. The junction of the resistor 21 and the anode of the diode 22 is connected via a lead 23 to a movable contact 24 of a double pole, double throw switch 26. The switch 26 has a second movable pole 27 connected via a series circuit comprising an ammeter 28 and a high impedance 29 to the lead 14. The switch 26 is provided with a first pair of stationary contacts 31 and 32 which are connected respectively to electrodes 33 and 34. The electrodes 33 and 34 are adapted to be disposed in the bath to be analyzed and are illustrated in FIGURE 3 as extending into a liquid 36 disposed in a container 37. The switch 26 is provided with a second pair of stationary contacts 38 and 39 having a fixed resistance 41 connected therebetween.

To measure the voltage across the circuit including the ammeter 28 and whatever load is placed across the switch 26, there is provided an indicating and contact making volt meter 42. The meter 42 is provided with a coil 43 for causing movement of a pointer 44 over a voltage indicating scale 46. The meter is further provided with a movable contact 47 and a stationary contact 48. The operation of the device is such that when the pointer 44 deflects a predetermined amount toward the right, as illustrated in FIGURE 3, it moves the movable contact 47 into engagement with the stationary contact 48 to complete both an internal and an external circuit. More particularly, the movable contact 47 is connected through a holding coil 49 to a lead 51 which is also connected to one end of the coil 43. The upper end of the coil 43 is connected to a lead 52 which extends to a junction 53 of a pair of resistors 54 and 56. The resistors 54 and 56 are connected in series between the lead 23 and a point on the connection between the meter 28 and the resistor 29. Thus, the meter 42 is sensitive to the voltage across resistor 56 which in turn is indicative of the voltage across the series circuit comprising the meter 28 (this portion of the voltage being negligible) and the voltage across whatever circuit is connected into the system by means of the switch 26.

The stationary contact 48 of the meter 42 is connected via a lead 57 to a lower terminal of a coil 58 of an electromagnetic relay switch 59. The upper end of the coil is connected via a resistor 61 and a lead 62 to the output lead 13 from the regulated supply 12. The electromagnetic switch 59 further comprises a set of contacts 63, which will be discussed in detail subsequently, and the coil 58 is shunted by a capacitor 64. The resistor 29 is a very high impedance which, when connected to the circuit, has the effect of discontinuing flow to the system. A resistor is employed rather than merely opening the circuit to the system so that the electrodes 33 and 34 do not float electrically, with respect to the remainder of the system during the periods of interrupted current.

In order to remove the resistor 29 from the system during the intervals when it is desired to measure the voltage between the electrodes 33 and 34, there is provided an electromagnetic switch 66 comprising a set of contacts 67, connected across the resistor 29, and a coil 68. The upper end of the coil 68, as viewed in FIGURE 3, is connected via a lead 69 to the ouput lead 14 of the supply 12 and the lower end of the coil 68 is connected to a movable contact 71 of a synchronous switch 72 which together with switch 66 constitute a means for repeatedly automatically interrupting the current between electrodes 33 and 34. The switch 72 may be an electromagnetic switch but preferably is a cam operated switch in which the cam is driven by a synchronous motor having a winding 73. The winding 73 of the synchronous motor is connected across the alternating current input leads 10 and 11 via leads 74 and 76 respectively. The synchronous switch 72 is provided with a stationary contact 77 which cooperates with the movable contact 71. The stationary contact 77 is connected to the lead 62 and thereby is returned to the output lead 13 from the supply 12.

Returning now to the contact 63 of the electromagnetic switch 59, these contacts are connected in series with a coil 78 of an electromagnetic switch 79 across the leads 74 and 76. The electromagnetic relay switch 79 comprises a single pole, double throw switching arrangement including a movable contact 81 and two stationary contacts 82 and 83. The movable contact 81 is normally in engagement with the stationary contact 82 which is connected via a light bulb 84 to a junction 86. The junction 86 is connected via a lead 87 to the lead 76 and is further connected through a second light bulb 88 to the stationary contact 83.

The operation of the apparatus is as follows:

Upon alternating current being applied to the leads 10 and 11, direct current is established across the leads 13 and 14. The switch 26 is initially moved to the left, as viewed in FIGURE 3, to contact the standard resistor 41 in the circuit. Upon the power being applied to the leads 10 and 11, the synchronous cam operated switch 72 opens and closes the contacts 71 and 77 at a predetermined rate, thereby periodically energizing the electromagnetic switch 66. The period at which switch 72 is set to operate has an important bearing on the proper operation of the apparatus for the reason that it generally takes at least about 0.5 second for the cathod in bath 36 to become depolarized and this is necessary to insure that the voltage across the bath during the next test period will be at a relatively low level if the acid concentration is such that a relatively low voltage across the bath is possible. In other words, if sufficient off time is not allowed, the hysteresis effect previously mentioned is not minimized and the effect desired from repetitively interrupting the circuit by means of switch 72 is not achieved. Excellent results have been obtained with the switch 72 so adjusted that it is alternately opened and closed for 2.5 second intervals in each instance. Of course there is no inherent upper limit as to the length of the periods established by switch 72 except that the longer the periods the less rapid is the response of the equipment in indicating an improper or a corrected condition.

As a result of the operation of switch 72, switch 66 is alternately opened and closed at the above-mentioned repetitive rate so that resistor 29 is periodically short-circuited. When the resistor 29 is not short-circuited, only a very small current flows through the system, which current is normally below the measuring capacity of the meter 28. During the interval when the resistor 29 is short-circuited, current flows through the resistor 41 at a level determined by the settings of the variable resistors 19 and 21. The value of the resistor 41 connected in the circuit is chosen such that it offers an actual resistance roughly equal to the apparent resistance of a bath of a desired concentration under the desired conditions of operation. The resistors 19 and 21 are then varied through their total ranges to make certain that the apparatus is operating properly and is capable of providing a proper range of current levels as indicated by meter 28.

If the apparatus appears from the above test to be capable of satisfactory operation, switch 26 is moved into the right hand position, as illustrated in FIG. 3, connecting electrodes 33 and 34 into the circuit. The resistors 19 and 21 are then varied to provide increasing current levels in solution 36 until an abrupt increase in voltage across the electrodes 33 and 34 is observed. (For this test switch 66 may be locked in a closed position so that the test is not periodically interrupted.) The voltage reading immediately before and immediately after the abrupt change is read from meter 42 and the current level is read from meter 28. Resistors 19 and 21 are then set such that the current, during periods when switch 66 is in a closed position, is very slightly less than that required to result in an abrupt increase in voltage across the electrodes 33 and 34, and the microswitch containing contacts 47 and 48 is positioned such that movable contact 47 is engaged by pointer 44 when pointer 44 indicates a voltage approximately half way between the two readings mentioned above. This setting insures that the contacts 47 and 48 will not be inadvertently closed by small vibrations of the pointer 44 or by minor changes in the voltage across electrodes 33 and 34 but will be closed if the voltage across the electrodes during a test period or during successive test periods undergoes an abrupt increase of the magnitude observed in the above-described test.

The contact 81 of the electromagnetic switch 79 is normally in engagement with the stationary contact 82 so that the lamp 84 is normally illuminated, this condition indicating that the concentration of nitric acid is at or above the desired value. So long as this condition exists, the lamp 84 remains illuminated. If the concentration of nitric acid falls below the desired value, the voltage between the electrodes 33 and 34 rises appreciably during each on cycle so that the contacts 47 and 48 are closed each time switch 72 is closed. Closure of the contacts 47 and 48, in addition to charging the large electrolytic capacitor 64, also energizes the relay 59 closing its contacts 63 thus energizing the relay 79. Energization of the relay 79 causes the movable contact 81 to engage the stationary contact 83 and the lamp 88 is illuminated while the lamp 84 is de-energized. Illumination of the lamp 88 indicates that the concentration of nitric acid is below that desired.

When the acid concentration drops to a level such that light 88 is energized, it would remain lit only momentarily and would be extinguished each time switch 72 is opened, regardless of the acid concentration in the bath, if it were not for the capacitor 64 and the high impedance of the coil 58. During such time that the switch 72 is open capacitor 64 discharges through coil 58 keeping contacts 63 closed at least until switch 72 is again closed. If the low acid concentration of the bath remains uncorrected, movement of pointer 44 during the next test period again results in closure of contacts 47 and 48 so that capacitor 64 again becomes fully charged and light 88 remains lit. If the low acid concentration is corrected, the contacts 47 and 48 are not closed and capacitor 64 is not recharged but continues to discharge through coil 58 until the current is insufficient to prevent the opening of contacts 63, the extinction of light 88 and the energizing of light 84.

Figure 4:
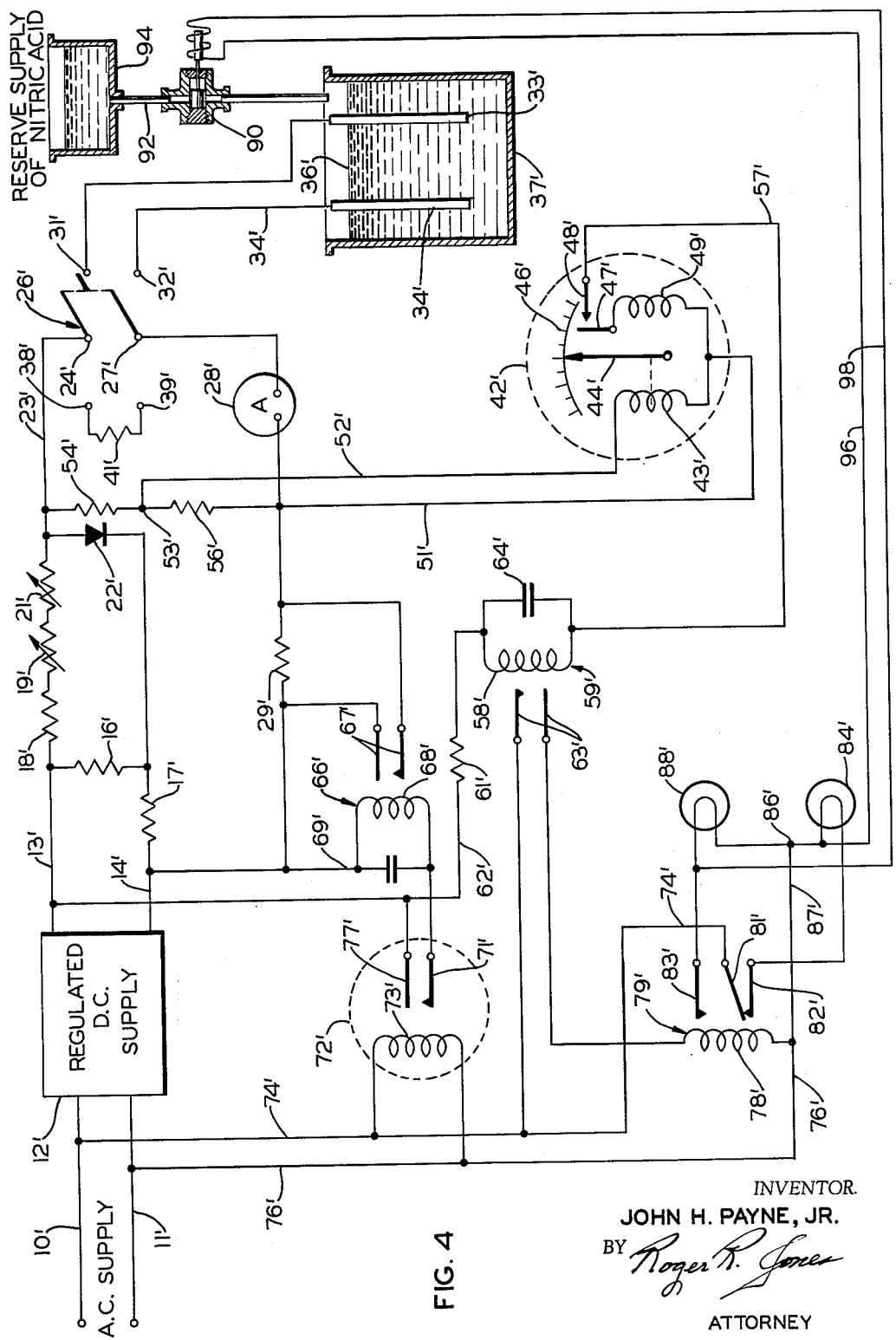
FIGURE 4 is a schematic wiring diagram of apparatus generally identical to that illustrated in FIGURE 3 but including means for automatically controlling nitric acid concentration in a bath.

With particular reference to FIGURE 4 of the drawings there is illustrated an arrangement generally similar to that illustrated in FIGURE 3 but including means to automatically control the concentration of nitric acid in a bath. In FIGURE 4 of the drawings like parts are numbered the same as in FIGURE 3 except that primed reference numerals are used.

The reference number 90 in FIGURE 4 represents a normally closed, solenoid operated valve, which is disposed in a conduit 92 leading from a container 94 containing a reserve supply of nitric acid. Valve 90 is operatively connected by means of electrical leads 96 and 98 in parallel relationship with light 88' so that when light 88' is energized, valve 90 is opened.

In operation, when the acid concentration in bath 36' drops to an undesirably low level light 88' is energized, as fully described in connection with the description of the apparatus of FIGURE 3 of the drawings, and valve 90 is simultaneously opened as a result of electrical current passing through leads 96 and 98. When valve 90 is opened nitric acid passes by gravity flow through conduit 92 into container 37' until the acid concentration of bath 36' reaches a preselected value so that the supply of energy to light 88' is terminated as fully explained in connection with the description of the apparatus of FIGURE 3 of the drawings. Valve 90 then returns to its normally closed position so that the addition of acid to bath 36' from reserve supply container 94 terminates. If the concentration of acid in bath 36' should again drop below a preselected level so that light 88' is again energized, the process is repeated and acid is again automatically added to bath 36' from container 94. It will be seen, therefore, that with the arrangement of FIGURE 4 of the drawings the apparatus not only indicates an acid deficiency but also serves to correct the deficiency and maintain the concentration at approximately the desired level.

To employ the apparatus illustrated in FIG. 3 for the measurement of the nitric acid concentration of an unknown solution of known total acidity and salt concentration, switch 26 is placed such that electrodes 33 and 34 are connected into the circuit and variable resistors 19 and 21 are used to provide an increasing current density until pointer 44 indicates a sudden jump in voltage. At this point the current density necessary to provide the sudden increase in voltage is noted and as a cross-check the voltage both before and after the abrupt increase can also be noted. By comparison to values for these variables obtained with known solutions and interpolation if necessary, the nitric acid concentration of the unknown can be ascertained.

The apparatus illustrated in FIG. 3, although forming a useful and novel circuit for practicing the methods of the present invention, is not restrictive as to form and many permissible variations will be readily apparent to those skilled in the art. For example, relay 66 can be eliminated and switch 72 can be employed directly to short circuit resistor 29. As another illustration, the meter 42 is only one form of measuring circuit which may be utilized at this point and it may be replaced by other well known types of voltage measuring or indicating apparatus.

While several embodiments of the invention have been described and illustrated, it will be clear that variations of the details of construction which are specifically illustrated and described may be resorted to without departing from the true spirit and scope of the invention.

What is claimed is:

1. A method of establishing the nitric acid concentration of a solution of nitric acid, which method comprises passing an electric current through an aqueous nitric acid solution to provide a selected current density of from 0.01 to 10 amps per square centimeter of cathode area, varying at least one of (1) current density through said aqueous nitric acid solution and (2) nitric acid concentration of said aqueous nitric acid solution, and discerning a resulting abrupt fluctuation in voltage across said aqueous nitric acid solution which is non-linearly proportional to the variation made to effect said fluctuation in voltage.

2. A method according to claim 1 wherein the current density provided is from about 0.1 to 2 amps per square centimeter of cathode area.

3. A method according to claim 1 wherein said curent density is retained substantially constant and the nitric acid concentration is varied to obtain an abrupt change in voltage across said aqueous nitric acid solution.

4. A method of establishing the nitric acid concentration of an aqueous solution comprising nitric acid and phosphoric acid which comprises passing an electric current through said solution at a temperature of from 80° C. to 120° C. such that a current density of from 0.01 to 10 amps per square centimeter is established, varying at least of (1) current density through said solution and (2) nitric acid concentration of said solution, and discerning a resulting abrupt change in voltage across said solution.

5. A method according to claim 4 wherein the water content of said solution is from about 10% to 60% by weight.

6. A method of determining a drop below a selected minimum of the nitric acid concentration of an aqueous solution comprising nitric acid and phosphoric acid, which method comprises passing an electric current through said solution at a temperature of at least about 60° C. such that a current density of from 0.01 to 10 amps per square centimeter is established, adjusting said current density such that any substantial increase therein results in an abrupt increase in the voltage across said solution, and measuring the voltage across said solution to ascertain any abrupt increase therein.

7. A method according to claim 6 wherein the temperature of said solution is from about 80° C. to 120° C. and said current density is from about 0.1 to 10 amps per square centimeter.

8. A method according to claim 7 wherein the nitric acid concentration is maintained below about 5% by weight.

9. A method according to claim 7 wherein the current through said solution is repeatedly interrupted.

10. An apparatus useful for measuring the nitric acid concentration of a solution, said apparatus comprising in combination a pair of electrodes, means for generating between said electrodes when operatively immersed in said solution a current density of from 0.01 to 10 amps per square centimeter of cathode area, means for indicating the magnitude of current between said electrodes, and means for indicating a sudden fluctuation in voltage across said electrodes during a test period of a selected length.

11. An apparatus according to claim 10 including means responsive to an abrupt increase in voltage across said electrodes to effect the flow of additional nitric acid to said solution.

12. An apparatus useful for indicating the fall below a selected minimum of the nitric acid concentration of an aqueous solution comprising nitric acid and phosphoric acid, which apparatus comprises in combination a pair of electrodes, means for operatively providing a substantially constant current between said electrodes for at least a selected interval of operation, means cooperating with said means for providing current to automatically repeatedly interrupt said current for a selected time interval to thereby operatively provide a plurality of successive test periods during each of which a substantially constant current is established between said electrodes, and means for detecting a sudden variation in voltage across said electrodes during any one of said test periods.

13. Apparatus according to claim 12 including a means cooperating with said detecting means for visually indicating that a sudden change in voltage has occurred.

14. An apparatus according to claim 12 including solenoid means for effecting the flow of additional nitric acid to said solution when said detecting means detects an abrupt increase in voltage across said electrodes.

15. An apparatus comprising in combination a pair of electrodes suitable for use in an acid medium, means for providing a substantially constant level source of direct current connected to said electrodes, means for automatically repeatedly interrupting for a selected time interval a current between said electrodes to thereby provide a plurality of successive test periods, means for measuring the current magnitude between said electrodes during each of said test periods, means for detecting an abrupt increase in voltage across said electrodes during any one of said test periods, and means responsive to said detecting means for indicating that a sudden increase in voltage has occurred.

16. An apparatus comprising in combination a pair of electrodes, a substantially constant-level source of direct current connected to said electrodes, electric motor means for repeatedly interrupting and re-establishing a current between said electrodes to thereby provide successive test periods, means for detecting during each of said test periods, a voltage in excess of a selected value across said electrodes, means activated by said detecting means for indicating that a voltage in excess of said selected level has been detected, and means for retaining said indicating means, following its activation, in an activated condition until at least one entire subsequent test period passes without a voltage in excess of said selected level being detected by said detecting means.

17. A method for determining a drop below a selected minimum of the nitric acid concentration of an aqueous solution comprising nitric acid and a second source of hydrogen ions, which method comprises passing an electric current through said solution at a temperature of at least about 60° C., adjusting the current density of said electric current in said solution to a value such that, with said nitric acid concentration at a minimum desired level, a minor drop in nitric acid concentration results in a disproportionate increase in the voltage necessary to maintain said current density at substantially said value, and detecting any marked increase in the voltage necessary to maintain said current density at substantially said value.

18. A method for determining a drop below a selected minimum of the nitric acid concentration of an aqueous solution comprising nitric acid and phosphoric acid, which method comprises, for a plurality of test periods of selected time duration, passing an electric current through said solution at a temperature of at least about 60° C., adjusting the current density of said electric current in said solution to a value such that during any selected test period, with said nitric acid concentration at a minimum desired level, a minor drop in nitric acid concentration results in a disproportionate increase in the voltage necessary to maintain said current density at substantially said value, and detecting any marked increase in the voltage necessary to maintain said current density at substantially said value through a consecutive plurality of said test periods.

19. An apparatus useful for indicating a fall below a selected minimum of the nitric acid concentration of an aqueous solution comprising nitric acid and phosphoric acid, which apparatus comprises in combination a pair of electrodes including a cathode having a selected surface area and an anode having a surface area in excess of that of said cathode, a substantially constant level source of direct current connected across said cathode and said anode, means for adjusting said source of direct current to provide a selected current density, based on cathode area, in an aqueous nitric acid solution in which the said electrodes are immersed, means for periodically interrupting a flow of current between said electrodes to thereby provide successive test periods, and means for detecting a marked increase, persisting through a plurality of successive test periods, in the voltage across said electrodes, whereby the current density in said aqueous nitric acid solution can be adjusted to a value with respect to the nitric acid concentration of said aqueous nitric acid solution such that a small decrease in nitric acid concentration results in a disproportionate increase in the voltage necessary to maintain said current density at said value and any decrease of said nitric acid concentration below said selected minimum is detected.

20. Apparatus according to claim 19 including visual indicating means cooperating with said detecting means to indicate a persistent drop in nitric acid concentration below said selected level.

21. Apparatus according to claim 19 including means responsive to said detecting means for automatically increasing the nitric acid concentration of said aqueous nitric acid solution when said detecting means determines a substantial increase in the voltage across said electrodes persisting through a plurality of consecutive test periods.

References Cited by the Examiner

UNITED STATES PATENTS

| 2,586,169 | 2/1952 | Kline | 324—30 |
| 2,656,526 | 10/1953 | MacKay | 324—30 X |
| 2,847,641 | 8/1958 | Clark | 324—30 |
| 2,862,177 | 11/1958 | Titterington | 324—29 |
| 2,871,446 | 1/1959 | Wann | 324—64 |
| 3,014,178 | 12/1961 | Dunn | 324—30 |
| 3,061,773 | 10/1962 | Ellison et al. | 324—30 |
| 3,063,929 | 11/1962 | Phelan | 324—30 X |
| 3,067,123 | 12/1962 | Huber | 324—29 X |

OTHER REFERENCES

Kolthoff et al.: "A New Method for the Polarographic Determination of Nitrate," J. of the American Chemical Society, volume 66, October 1944, pages 1782–1786.

WALTER L. CARLSON, *Primary Examiner.*

SAMUEL BERNSTEIN, FREDERICK M. STRADER, *Examiners.*

A. E. SMITH, C. F. ROBERTS, *Assistant Examiners.*